July 21, 1925.                                                                1,547,047
C. KISTLER
FOOT ACCELERATOR
Filed March 5, 1925
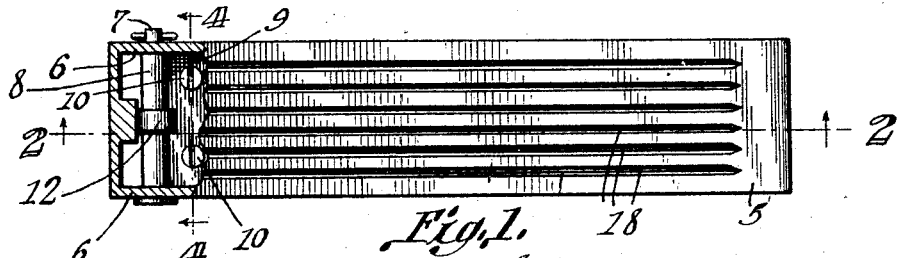
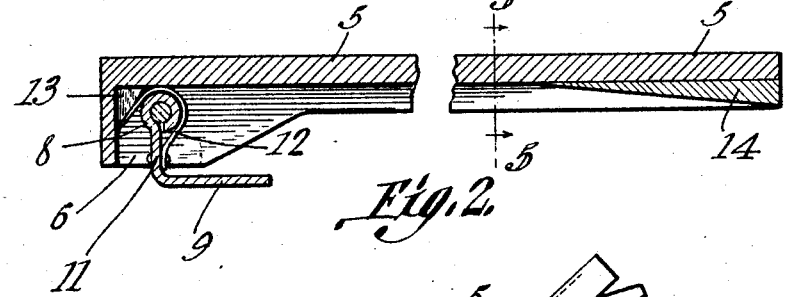
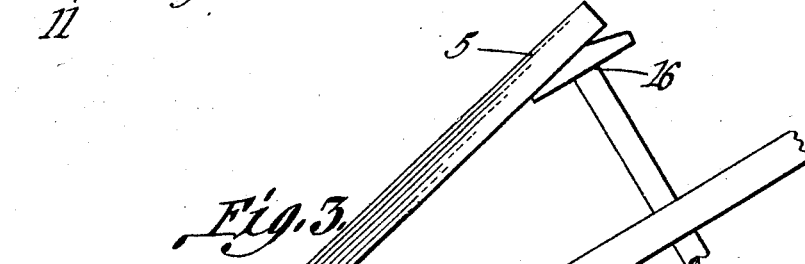
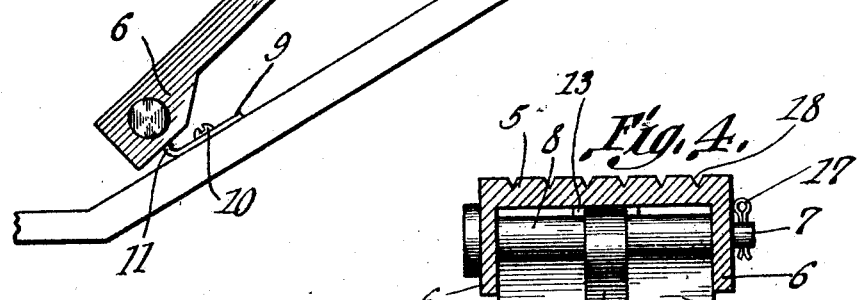
Inventor
C. Kistler Patented July 21, 1925.

1,547,047

UNITED STATES PATENT OFFICE.

CLYMER KISTLER, OF GREENSBURG, PENNSYLVANIA.

FOOT ACCELERATOR.

Application filed March 5, 1925. Serial No. 13,198.

*To all whom it may concern:*

Be it known that I, CLYMER KISTLER, a citizen of the United States, residing at Greensburg, in the county of Westmoreland and State of Pennsylvania, have invented a new and useful Foot Accelerator, of which the following is a specification.

This invention relates to foot rests and more particularly a foot rest especially designed for supporting the foot of an operator of a motor vehicle during the actuation of the accelerator forming a part of the usual motor vehicle construction.

An important object of the invention is to provide a device of this character to facilitate the operation of an accelerator to insure an even feeding of the gas to the engine.

A further object of the invention is the provision of means of this character which may be readily and easily disconnected and removed from its position on the floor board to permit the usual rug positioned on the floor board of a car to be removed for cleaning purposes.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a plan view of a device constructed in accordance with the invention.

Figure 2 is a sectional view taken on line 2—2 of Figure 1.

Figure 3 is a side elevational view illustrating the application of the device.

Figure 4 is a sectional view taken on line 4—4 of Figure 1.

Figure 5 is a sectional view taken on line 5—5 of Figure 2.

Referring to the drawing in detail, the reference character 5 designates the foot rest which may be constructed of any suitable material, the same being relatively long to comfortably support the foot of the operator.

The under portion of the foot rest is cut away defining spaced lateral flanges 6 which are formed with suitable openings to accommodate the pivot pin 7 that is also positioned in the tubular bearing member 8 formed at the upper end of the bracket 9 which is provided with suitable openings to accommodate the securing screws 10 by means of which the bracket 9 may be secured to the floor board of a motor vehicle.

As shown, the tubular member 8 is formed at the outer extremity of the right angled end portion 11 of the bracket member, so that when the foot rest 5 is positioned over the bracket member, the flanges 6 will engage the ends of the tubular bearing member 8 to restrict lateral movement of the foot rest 5 and insure a true swinging of the foot rest in a vertical plane.

Secured to the right angled portion 11 is a spring 12 which is curved around the bearing member 8 and has its free end resting against the block 13 that is secured between the flanges 6, the surface against which the spring 12 engages being disposed at an oblique angle with respect to the upper surface of the foot rest to normally urge the foot rest downwardly.

The reference character 14 indicates a plate secured to the under surface of the foot rest 5, which plate has an inclined surface adapted to rest on the head of the accelerator 16 which is of the usual construction and held to the limit of its upward movement by means of the usual spring, not shown.

In order that the foot rest may be readily and easily removed to facilitate the cleaning of the floor board, a cotter key indicated at 17 is provided, which cotter key extends through a suitable opening in one end of the pivot pin 7. Thus it will be seen that due to this construction, the cotter pin may be readily removed and the pin 7 slid from its bearing around the foot rest 5 to be removed.

It might be further stated that the upper surface of the foot rest may be covered with rubber or other material to prevent the slipping of the operator's foot while positioned thereon.

It may be desirable to form grooves in the upper surface of the rest such as indicated at 17.

When a foot rest of this character is in use, it will be noted that the operator's foot may be conveniently positioned to operate the accelerator.

I claim:—

A foot rest for accelerators including a body portion, a bracket member including a bearing, a pin extending through the bracket member and adapted to pivotally support the body portion, a spring secured to the bracket member, and curved around the bearing member, the free end of said spring adapted to engage the body portion to normally urge the body portion downwardly, and the outer end of said body portion adapted to rest on the accelerator of a motor vehicle.

In testimony that I claim the foregoing as my own, I have hereto affixed my signature in the presence of two witnesses.

CLYMER KISTLER.

Witnesses:
FRANK KISTLER,
DANIEL KISTLER.